(12) United States Patent
Hart (10) Patent No.: US 9,225,377 B1
(45) Date of Patent: Dec. 29, 2015

(54) MODULAR ELECTRONIC DEVICE CASE FOR USE WITH TABLET-SHAPED ELECTRONIC DEVICES

(71) Applicant: Brookstone Purchasing, Inc., Merrimack, NH (US)

(72) Inventor: Rene Hart, Amherst, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 0 days.

(21) Appl. No.: 14/560,382

(22) Filed: Dec. 4, 2014

Related U.S. Application Data

(63) Continuation-in-part of application No. 14/456,672, filed on Aug. 11, 2014.

(51) Int. Cl.
*B65D 5/52* (2006.01)
*H04B 1/3877* (2015.01)
*H04B 1/3888* (2015.01)

(52) U.S. Cl.
CPC ............ *H04B 1/3877* (2013.01); *H04B 1/3888* (2013.01)

(58) Field of Classification Search
CPC combination set(s) only.
See application file for complete search history.

(56) References Cited

U.S. PATENT DOCUMENTS

| | | | |
|---|---|---|---|
| 4,259,568 A | 3/1981 | Dynesen | |
| 5,682,182 A | 10/1997 | Tsubosaka | |
| 5,887,723 A | 3/1999 | Myles et al. | |
| 6,301,098 B1 | 10/2001 | Kim | |
| 6,697,045 B2 | 2/2004 | Min | |
| 6,763,942 B1 | 7/2004 | Yeh | |
| 6,772,879 B1 | 8/2004 | Domotor | |
| 7,054,441 B2 | 5/2006 | Pletikosa | |
| D525,951 S | 8/2006 | Gibby et al. | |
| D526,974 S | 8/2006 | Reza et al. | |
| 7,281,698 B2 | 10/2007 | Patterson, Jr. | |
| 7,545,634 B2 | 6/2009 | Simonian et al. | |
| 8,143,982 B1 | 3/2012 | Lauder et al. | |
| 8,230,992 B2 | 7/2012 | Law et al. | |
| 8,312,991 B2 | 11/2012 | Diebel et al. | |
| D672,781 S | 12/2012 | Lu | |

(Continued)

FOREIGN PATENT DOCUMENTS

| CN | 201774288 U | 3/2011 |
|---|---|---|
| EP | 1227387 A1 | 7/2002 |

OTHER PUBLICATIONS www.goincase.com, iPad Origami Workstation, SKU CL60296, Dec. 3, 2013, 3 pages.

(Continued)

*Primary Examiner* — Jacob K Ackun
(74) *Attorney, Agent, or Firm* — Grossman Tucker Perreault & Pfleger, PLLC (57) ABSTRACT

A modular electronic device case includes a jacket and a shell removably coupled to the jacket. A tablet-shaped electronic device, such as a tablet computer, may be secured in the shell and may be covered by the jacket when the shell is coupled to the jacket. The shell may be removably coupled to the jacket using magnetic coupling. Thus, the tablet-shaped electronic device, when secured in the shell, may be used with or without the jacket. The jacket may also include one or more foldable lines separating the jacket into foldable panels capable of being folded to form a stand for supporting the device in different configurations. The modular case may also include one or more additional components coupled to the jacket including, without limitation, a pocket, a backup battery, and/or a keyboard.

19 Claims, 11 Drawing Sheets

(56) References Cited

U.S. PATENT DOCUMENTS

| | | | |
|---|---|---|---|
| 8,328,008 | B2 | 12/2012 | Diebel et al. |
| 8,393,464 | B2 | 3/2013 | Yang et al. |
| 8,424,830 | B2 | 4/2013 | Yang et al. |
| D687,438 | S | 8/2013 | Lu |
| 8,499,933 | B2 * | 8/2013 | Ziemba ............ 206/320 |
| D690,702 | S | 10/2013 | Chung |
| 8,544,639 | B2 | 10/2013 | Yang et al. |
| D694,011 | S | 11/2013 | Mecchella |
| 8,607,976 | B2 | 12/2013 | Wu et al. |
| 8,640,864 | B2 | 2/2014 | Chen et al. |
| 8,757,375 | B2 | 6/2014 | Huang |
| 2004/0160735 | A1 | 8/2004 | Ghosh et al. |
| 2005/0105264 | A1 | 5/2005 | Chen |
| 2006/0272969 | A1 * | 12/2006 | Hartstein et al. ........ 206/320 |
| 2007/0193902 | A1 * | 8/2007 | Myers et al. ............ 206/320 |
| 2008/0237432 | A1 | 10/2008 | Patterson |
| 2009/0073337 | A1 | 3/2009 | Liou et al. |
| 2010/0122924 | A1 | 5/2010 | Andrews |
| 2011/0163642 | A1 | 7/2011 | Rohrbach et al. |
| 2011/0199727 | A1 | 8/2011 | Probst |
| 2011/0203955 | A1 | 8/2011 | Fasula |
| 2011/0266176 | A1 | 11/2011 | Still |
| 2011/0284420 | A1 | 11/2011 | Sajid |
| 2011/0290686 | A1 | 12/2011 | Huang |
| 2011/0290687 | A1 | 12/2011 | Han |
| 2011/0297564 | A1 | 12/2011 | Kim et al. |
| 2011/0297566 | A1 | 12/2011 | Gallagher et al. |
| 2012/0012483 | A1 | 1/2012 | Fan |
| 2012/0018324 | A1 | 1/2012 | Hale |
| 2012/0037285 | A1 | 2/2012 | Diebel et al. |
| 2012/0043234 | A1 | 2/2012 | Westrup |
| 2012/0138494 | A1 | 6/2012 | Thomas |
| 2012/0153116 | A1 | 6/2012 | Harrison |
| 2012/0211377 | A1 | 8/2012 | Sajid |
| 2013/0016467 | A1 | 1/2013 | Ku |
| 2013/0020214 | A1 | 1/2013 | Chiou |
| 2013/0020215 | A1 | 1/2013 | Hsu |
| 2013/0020216 | A1 | 1/2013 | Chiou |
| 2013/0048517 | A1 | 2/2013 | Mecchella |
| 2013/0134061 | A1 | 5/2013 | Wu et al. |
| 2013/0293430 | A1 | 11/2013 | Henty |
| 2014/0151248 | A1 * | 6/2014 | Hurst et al. ........ 206/45.23 |
| 2014/0202888 | A1 | 7/2014 | Lieblein |
| 2014/0262853 | A1 * | 9/2014 | DeChant ............ 206/45.2 |

OTHER PUBLICATIONS www.coach.com/online/handbags, Bleecker Leather Molded Origami Ipad Case, Style No. 66725, Mar. 13, 2014, 1 pg.

www.amazon.com: Moshi iGlaze VersaCover Origami Case With Wake/Sleep Function for iPad Mini, by Moshi, Date first available at Amazon.com: Nov. 11, 2012, 2 pgs.

www.amazon.com: Kyasi APLJUS Origami Flip Cover for Apple iPad 3 or iPad 4, by Kyasi, Date first available at Amazon.com: Nov. 2, 2012, 2 pgs.

* cited by examiner

MODULAR ELECTRONIC DEVICE CASE FOR USE WITH TABLET-SHAPED ELECTRONIC DEVICES

CROSS-REFERENCE TO RELATED APPLICATIONS

This application is a continuation-in-part of co-pending U.S. patent application Ser. No. 14/456,672 filed on Aug. 11, 2014, fully incorporated herein by reference.

TECHNICAL FIELD

The present invention relates to covers or cases for electronic devices such as tablet computers and more particularly, to a modular electronic device case including jacket, tablet shell, and keyboard.

BACKGROUND INFORMATION

Various types of covers and cases have been designed for electronic devices including tablet computers such as an iPad® tablet computer. Many of these cases attempt to protect the electronic device or tablet computer from damage without adding too much bulk and/or weight and without sacrificing the functionality of the device. Some cases add additional functional features, such as a wireless keyboard, which further adds to the bulk and/or weight. One of the challenges is designing a case that provides the desired protection for the device without sacrificing functionality and the lightweight, portable design of the device and while also allowing a wireless keyboard or other additional component.

BRIEF DESCRIPTION OF THE DRAWINGS

These and other features and advantages will be better understood by reading the following detailed description, taken together with the drawings wherein.

DETAILED DESCRIPTION

A modular electronic device case, consistent with embodiments of the present disclosure, includes a jacket and a shell removably coupled to the jacket. A tablet-shaped electronic device, such as a tablet computer, may be secured in the shell and may be covered by the jacket when the shell is coupled to the jacket. The shell may be removably coupled to the jacket using magnetic coupling. Thus, the tablet-shaped electronic device, when secured in the shell, may be used with or without the jacket. The jacket may also include one or more foldable lines separating the jacket into foldable panels capable of being folded to form a stand for supporting the device in different configurations. The modular case may also include one or more additional components coupled to the jacket including, without limitation, a pocket, a backup battery, and/or a keyboard.

As used herein, "tablet computer" refers to any type of mobile computer including a display, circuitry and battery in a tablet shape. A tablet computer is not limited to any particular size or functionality and may include tablet-shaped smart phones. Embodiments of the modular electronic device cases described herein may be used with larger tablet computers, such as an iPad® tablet computer, or smaller tablet computers, such as an iPad® mini tablet computer or an iPhone® tablet-shaped smart phone. Embodiments of the modular electronic device cases may also be used with other tablet-shaped electronic devices.

Figure 1:
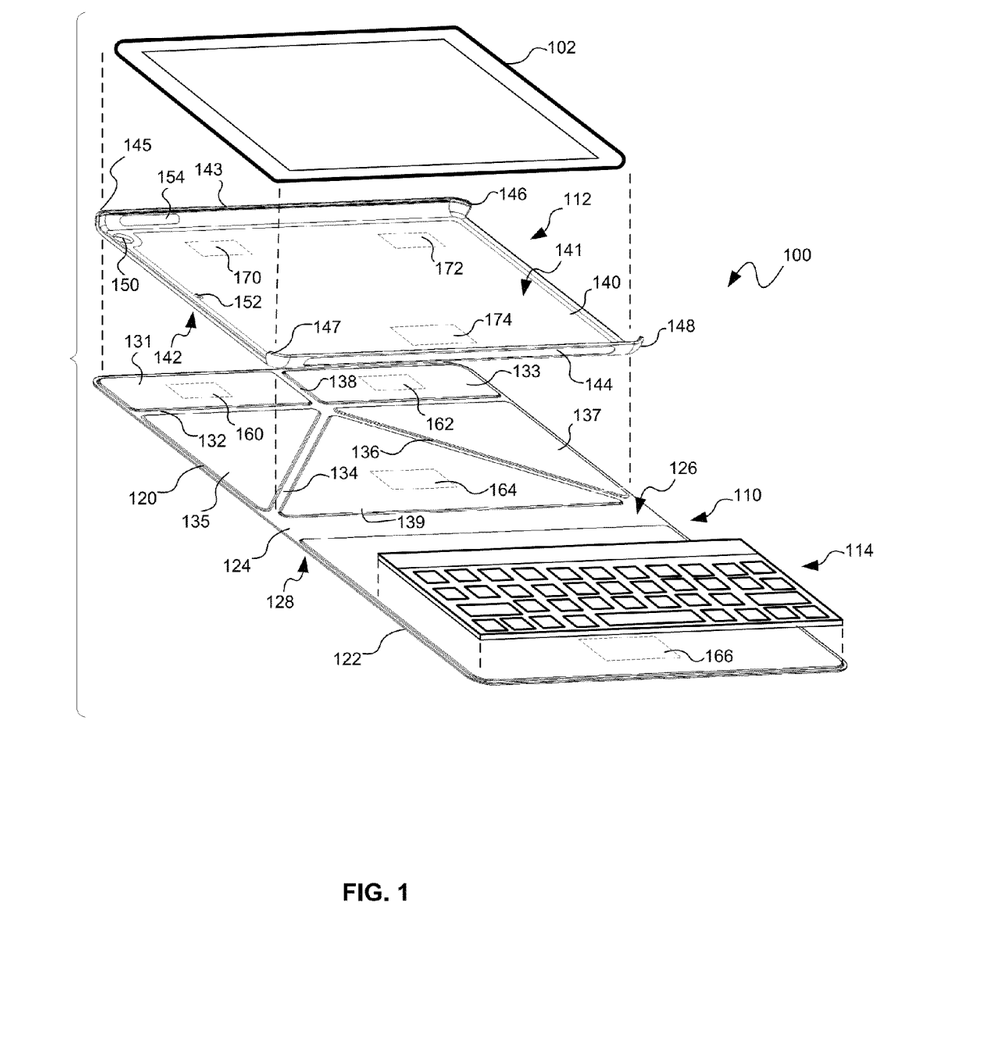
FIG. 1 is an exploded perspective view of a modular tablet case, consistent with an embodiment of the present disclosure.
Figure 2:
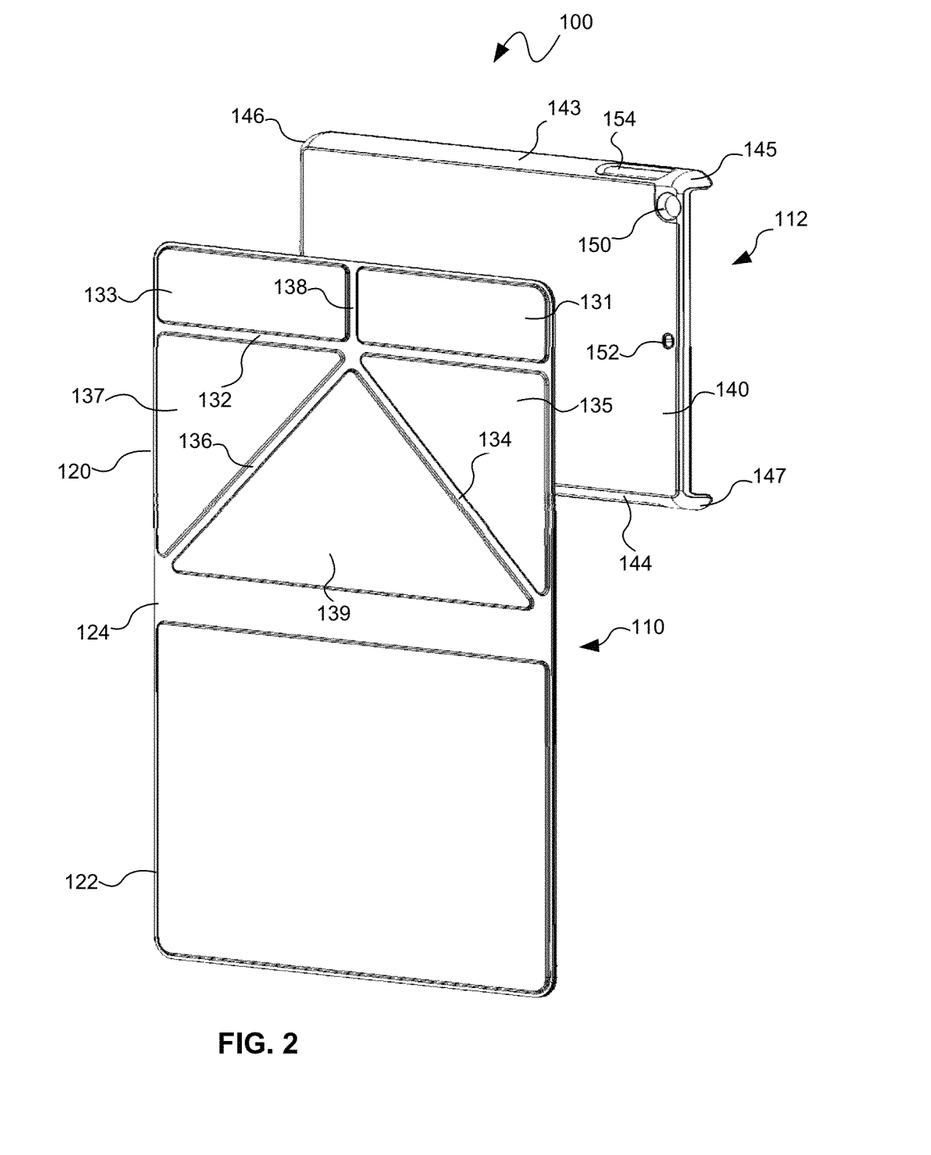
FIG. 2 is a perspective back view of the modular tablet case shown in FIG. 1 without the keyboard and the tablet computer.
Figure 3:
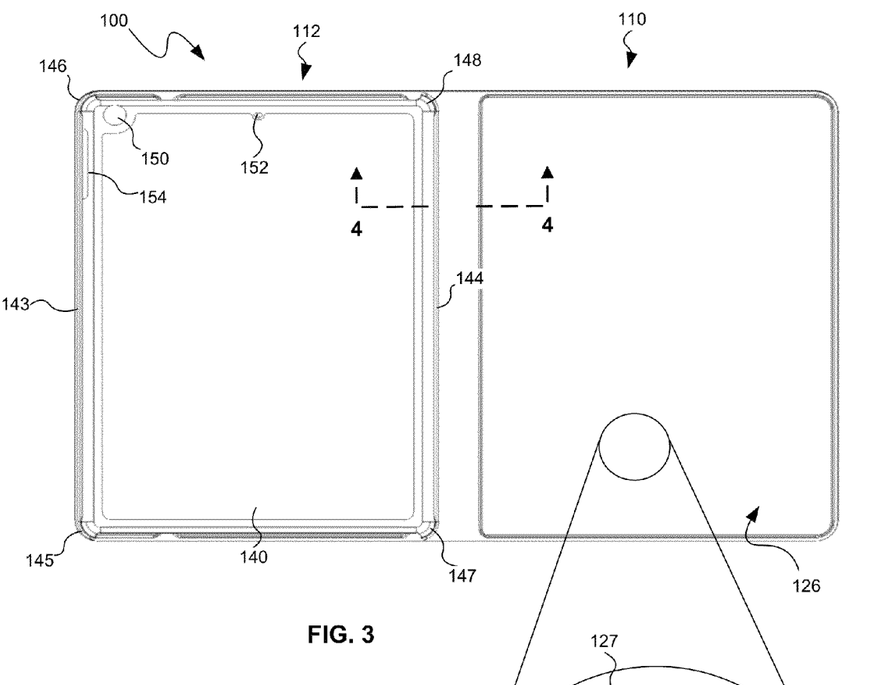
FIG. 3 is a top plan view of the modular tablet case shown in FIG. 1 without the keyboard and the tablet computer.
Figure 3A:
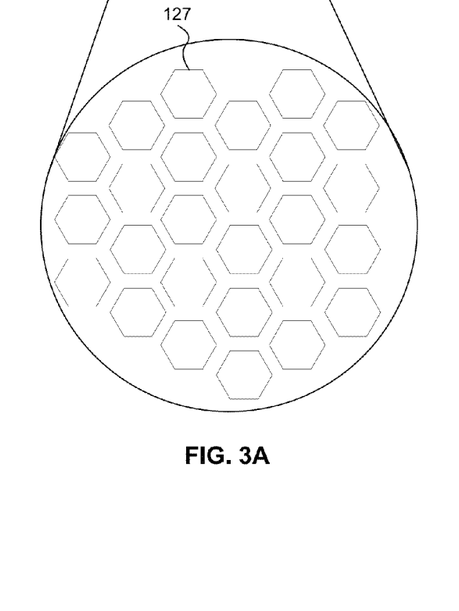
FIG. 3A is an enlarged view of the surface texture inside the jacket shown in FIG. 3, consistent with an embodiment of the present disclosure.

Referring to FIGS. 1 and 2, a modular tablet case 100, consistent with embodiments of the present disclosure, is shown and described. The modular tablet case 100 may be used with a tablet computer 102, such as an iPad® tablet computer, or other tablet-shaped electronic device. The modular tablet case 100 generally includes a jacket 110, a shell 112 removably coupled to one portion of the jacket 110, and a keyboard 114 removably coupled to another portion of the jacket 110. In an example embodiment, the shell 112 and the keyboard 114 are removably coupled to the jacket 110 using magnetic coupling. The jacket 110 and/or shell 112 may have various sizes to accommodate different sized tablet computers. In one embodiment, different sized shells 112 designed for different sized tablet computers 102, such as an iPad® Air tablet computer and an iPad® 4$^{th}$ Generation tablet computer, may be used with the same sized jacket 110. Thus, one jacket 110 may be used with different shells and tablet computers, thereby extending the utility of the modular tablet case 100 as the sizes of tablet computers change.

The jacket 110 includes a first jacket portion 120 hingedly coupled to a second jacket portion 122 with a hinge 124. The hinge 124 may be a living hinge formed by the material forming the first and second jacket portions 120, 122. The jacket 110 has an inside surface 126 and an outside surface 128. The shell 112 and the keyboard 114 may be removably coupled to first jacket portion 120 and the second jacket portion 122, respectively, on the inside surface 126. The first and second jacket portions 120, 122 may thus be closed by folding along the hinge 124 to cover the tablet computer 102 and/or keyboard 114 when attached to the jacket 110.

The first jacket portion 120 may include one or more foldable lines 132, 134, 136, 138 separating the first jacket portion 120 into multiple foldable panels 131, 133, 135, 137, 139. As used herein, "foldable line" refers to a linear region of the jacket 110 that is more susceptible to folding than other regions of the jacket 110. The foldable lines 132, 134, 136, 138 may be formed as living hinges from the material of the first jacket portion 120. The first jacket portion 120 may be folded along one or more of the foldable lines 132, 134, 136, 138 such that the foldable panels 131, 133, 135, 137, 139 form various stand configurations for supporting the tablet computer (with or without the shell 112), as described in greater detail below.

In the example embodiment, the first jacket portion 120 includes at least one lengthwise foldable line 132 extending lengthwise across the first jacket portion 120, diagonal foldable lines 134, 136 extending from proximate the hinge 124 to a mid region of the lengthwise foldable line 132, and a lateral foldable line 138 extending from the mid region of the lengthwise foldable line 132 to an edge of the first jacket portion 120. The lengthwise foldable line 132 and the lateral foldable line 138 form foldable end panels 131, 133, and the diagonal foldable lines form foldable triangular panels 135, 137 and a central triangular panel 139. In this example, the first jacket portion 120 may be folded along all of the foldable lines 132, 134, 136, 138 to form a stand configuration or along only the lengthwise foldable line 132 to form a stand configuration, as described in greater detail below.

In other embodiments, the first jacket portion 120 may include other configurations of foldable lines and panels capable of forming stand configurations. The first jacket portion 120 may include, for example, only the lengthwise foldable line 132. The foldable panels may also have other shapes.

The shell 112 is designed to receive and secure the tablet computer 102. The shell 112 includes a main body portion 140 with a front side 141 for receiving the tablet computer 102 and a back side 142 for removably coupling to the first jacket portion 120. The shell 112 also includes at least two edge portions 143, 144 that grip opposing edges of the tablet computer 102 to hold the tablet computer 102 with a friction fit against the front side 141. In the example embodiment, the edge portions 143, 144 extend lengthwise and include corner portions 145, 146, 147, 148 that engage four corners of the tablet computer 102. Other configurations of the shell 112 capable of securing a tablet computer are also within the scope of the present disclosure. The shell 112 may include, for example, only two corner portions or may include edge portions on the other edges.

The shell 112 may be designed to provide access to inputs and outputs of the tablet computer 102 when secured in the shell 112. The example embodiment of the shell 112 includes a camera window 150 located in the main body portion 140 and aligned with the camera on the tablet computer 102, a mic window 152 located in the main body portion 140 and aligned with the microphone on the tablet computer 102, and a control window 154 located in the edge portion 143 and aligned with controls (e.g., volume) on the tablet computer. The shell 112 may also include other input/output access windows in other locations depending upon the tablet computer. The control access windows may be any type of openings or cut outs capable of providing access to an input or output of the tablet computer to allow the input or output to function.

The keyboard 114 may include a wireless communication system, such as a Bluetooth® wireless communication system, for wirelessly communicating with the tablet computer 102. Although the example embodiment uses a standard QWERTY keyboard, other types of keyboards may also be used. The keyboard 114 may be used while secured to the second jacket portion 122 or while removed from the second jacket portion 122.

In the example embodiment, the shell 112 and the keyboard 114 are removably coupled to the jacket 110 using magnetic coupling. Magnetic coupling may also be used to couple the foldable end panels 131, 133 when folded in at least one of the stand configurations. To provide magnetic coupling, the jacket 110 includes one or more magnetic coupling regions 160, 162, 164, 166, the shell 112 includes one or more corresponding magnetic coupling regions 170, 172, 174, and the keyboard 114 includes one or more corresponding magnetic coupling regions (not shown). A magnetic coupling region may include one or more magnets oriented with a polarity for magnetically attracting and coupling a magnet with an opposite polarity in a corresponding magnetic coupling region. In other embodiments, other coupling mechanisms may be used including, without limitation, hook and loop fasteners.

In the jacket 110, for example, one or more of the first jacket portion magnetic coupling regions 160, 162, 164 in the panels 131, 133, 139 may be magnetically coupled to one or more of the corresponding shell magnetic coupling regions 170, 172, 174 in the shell 112 such that the back side 142 of the shell 112 is held against the inside surface 126 of the first jacket portion 120. In one stand configuration when the first jacket portion 120 is folded along the lengthwise foldable line 132, for example, the first jacket portion magnetic coupling regions 160, 162 in the end panels 131, 133 may be magnetically coupled to the corresponding shell magnetic coupling regions 170, 172 in the shell 112. In another stand configuration when the first jacket portion 120 is folded along all of the foldable lines 132, 134, 136, 138, the first jacket portion magnetic coupling region 164 in the central triangular panel 139 may be magnetically coupled to the corresponding shell magnetic coupling region 174 in the shell 112. The first jacket portion magnetic coupling regions 160, 162 in the end panels 131, 133 may also be magnetically coupled to each other when the first jacket portion 120 is folded into at least one of the stand configurations, as described in greater detail below. The second jacket portion magnetic coupling region 166 in the second jacket portion 122 may be magnetically coupled to a keyboard magnetic coupling region (not shown) in the keyboard 114.

Referring to FIGS. 3-6, the structures of the example embodiment of the jacket 110 and the shell 112 are described in greater detail. Both the jacket 110 and the shell 112 may be designed with a relatively low profile such that the modular jacket case 100 is not too bulky when the jacket 110 is folded around the shell 112 and the keyboard 114. In one example, the jacket 110 may have a thickness of less than 5 mm (e.g., about 4 mm), the shell 112 may have a thickness that is less than 15 mm (e.g., about 11 mm), and the keyboard 112 may have a thickness that is less than 10 mm.

The jacket 110 may be made from outer layers 161, 163 of a flexible material, such as polyurethane, (see FIG. 4) to provide the desired flexibility for folding the jacket 110. This flexible material allows the jacket 110 to bend or fold, for example, along the hinge 124 and foldable lines 132, 134, 136, 138. The outer layer 161 on the inside 126 of the jacket 110 (i.e. on the side receiving the shell 112 and keyboard 114) may have a non-slip surface, for example, with texturing, to prevent the shell 112 from slipping when being supported on the first jacket portion 120 formed in a stand configuration. The non-slip surface may include, for example, a pattern or array of raised surface elements 127 (see FIG. 3A). The outer layer 163 on the outside 128 of the jacket 110 may include a textile-grained polyurethane fabric.

The jacket 110 may also include additional rigid layers between the outer layers to provide rigidity at certain locations, for example, in the panels 131, 133, 135, 137, 139 of the first jacket portion 120 and in the second jacket portion 122. These additional rigid layers may include one or more sheets 165, 167 of a material that is more rigid than the material of the outer layers 161, 163 including, without limitation, polycarbonate, fiberglass and cardboard. The sheets 165, 167 of rigid material are not located in the hinge 124 (see FIG. 4) or along the foldable lines 132, 134, 136, 138 such that the flexible outer layers 161, 163 form living hinges in these regions. One or more magnets 164a may also be sandwiched between the outer layers 161, 163 to provide the magnetic coupling regions. The magnets may include neodymium magnets having a magnetic flux density of about 1800 gauss or other magnets of similar strength.

Figure 4:
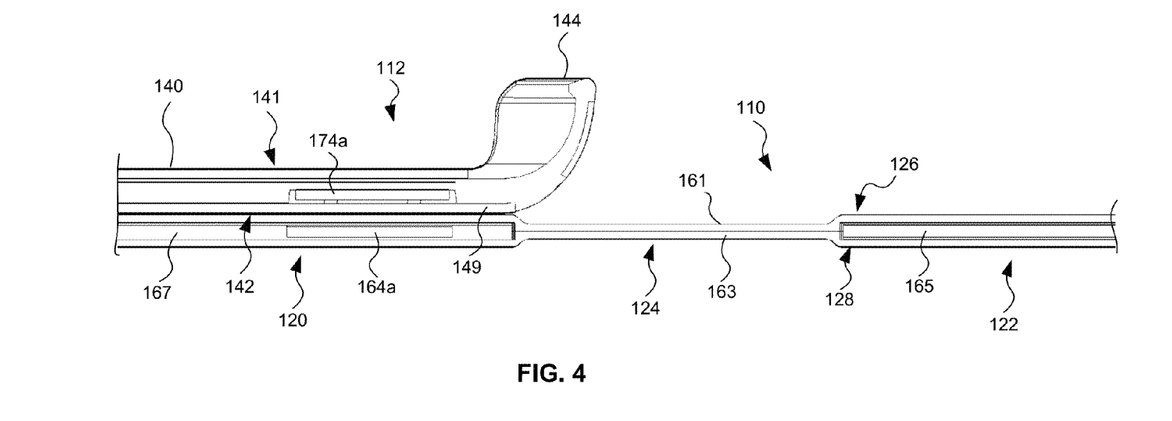
FIG. 4 is a side cross-sectional view of the modular tablet case taken along line 4-4 in FIG. 3.
Figure 5:
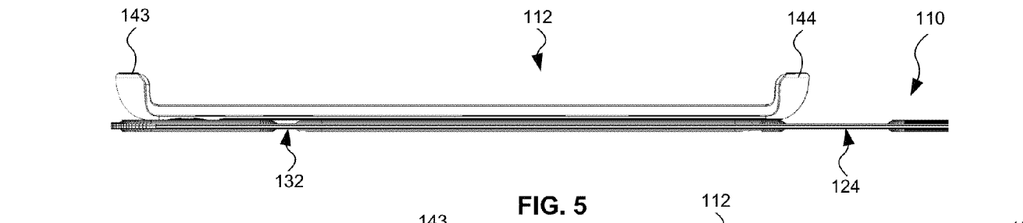
FIG. 5 is a side view of the modular tablet case shown in FIG. 3.
Figure 6:
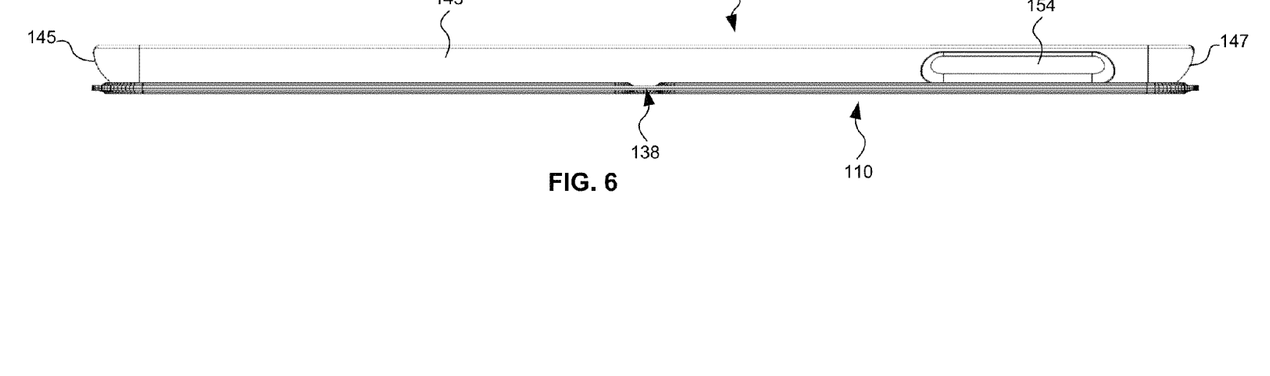
FIG. 6 is a back end view of the modular tablet case shown in FIG. 3.

The shell 112 may be made of a polycarbonate material to provide the desired rigidity for securing and protecting the tablet computer. The shell 112 may also include a non-slip surface on at least the back side 142 of the shell 112 to facilitate gripping the shell 112 and to prevent the shell 112 from slipping when being supported on the first jacket portion 120 formed in a stand configuration. The non-slip surface may be provided by a layer 149 of polyurethane and may be textured with a pattern or array of raised surface elements, similar to the polyurethane of the outer layer 161 of the jacket 110. The non-slip polyurethane may have a 30 to 40 shore A durometer.

Figure 7:
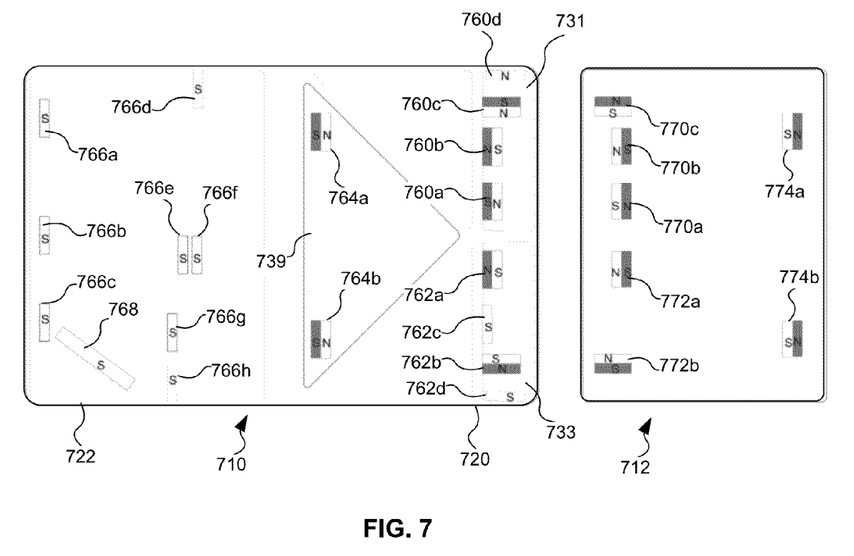
FIG. 7 is a top schematic view of a jacket and shell of a modular tablet case indicating locations and polarities of magnets for magnetic coupling, consistent with an embodiment of the present disclosure.
Figure 8:
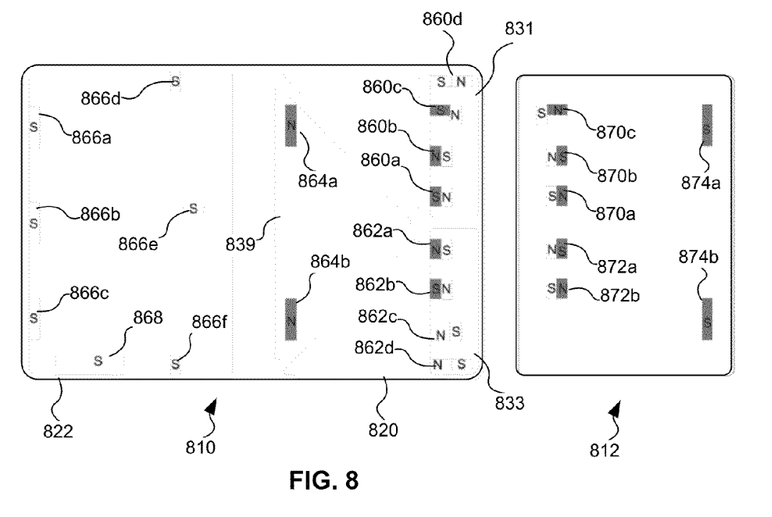
FIG. 8 is a top schematic view of a jacket and shell of a modular tablet case indicating locations and polarities of magnets for magnetic coupling, consistent with another embodiment of the present disclosure.

Referring to FIGS. 7 and 8, the magnetic coupling regions may be formed by various arrangements of magnets in a jacket 710, 810 and a shell 712, 812. FIG. 7 shows an arrangement of magnets in a jacket 710 and a shell 712 designed for a larger tablet computer such as an iPad® Air tablet computer. FIG. 8 shows an arrangement of magnets in a jacket 810 and shell 812 designed for a smaller tablet computer such as an iPad® Mini tablet computer. In both of these embodiments, the arrangements of magnets may include magnets oriented such that opposite polarities (i.e., north and south magnetic poles) of corresponding coupling magnets are aligned with each other. The magnets may also be oriented to provide stronger magnetic coupling when the corresponding magnets are in a certain position, thereby biasing the shell 712, 812 and/or keyboard to a desired position and orientation relative to the jacket 710, 810.

In the embodiment shown in FIG. 7, the jacket 710 includes a group of magnets 760a-d in a first end panel 731, a group of magnets 762a-d in a second end panel 733, and a group of magnets 764a-b in a central triangular panel 739. The shell 712 includes magnets 770a-c corresponding to the magnets 760a-c in the first end panel 731, magnets 772a-b corresponding to the magnets 762a-b in the second end panel 733, and magnets 774a-b corresponding to the magnets 764a-b in the central triangular panel 739. These magnets are oriented such that north and south polarities of corresponding magnets are aligned when the shell 712 is in the desired position relative to the first jacket portion 720. Thus, the position, orientation and polarities of the magnets facilitate orientation and alignment when magnetically coupling the shell 712 to the first jacket portion 720. The group of magnets 766a-h in the second jacket portion 722 are positioned to be aligned with magnets having opposite polarities in a keyboard (not shown). The group of magnets 760a-d in the first end panel 731 and the group of magnets 762a-d in the second end panel 733 also correspond with each other to magnetically couple the end panels 731, 733 when folded against each other.

In the embodiment shown in FIG. 8, the jacket 810 includes a group of magnets 860a-d in a first end panel 831, a group of magnets 862a-d in a second end panel 833, and a group of magnets 864a-b in a central triangular panel 839. The shell 812 includes magnets 870a-c corresponding to the magnets 860a-c in the first end panel 831, magnets 872a-b corresponding to the magnets 862a-b in the second end panel 833, and magnets 874a-b corresponding to the magnets 864a-b in the central triangular panel 839. These magnets are oriented such that north and south polarities of corresponding magnets are aligned when the shell 812 is in the desired position relative to the first jacket portion 820. Thus, the position, orientation and polarities of the magnets facilitate orientation and alignment when magnetically coupling the shell 812 to the first jacket portion 820. The group of magnets 866a-f in the second jacket portion 822 are positioned to be aligned with magnets having opposite polarities in a keyboard (not shown). The group of magnets 860a-d in the first end panel 831 and the group of magnets 862a-d in the second end panel 833 also correspond with each other to magnetically couple the end panels 831, 843 when folded against each other.

In each of these embodiments, the second jacket portion 722, 822 may also include at least one switch activating magnet 768, 868 for switching a tablet into sleep mode (e.g., when the jacket 710, 810 is closed) and for switching the tablet into a wake mode (e.g., when the jacket 710, 810 is opened). This switch activating magnet 768, 868 may be located in the second jacket portion 722, 822 at a position that allows the magnet 768, 868 to align with a magnetically actuated switch in the tablet computer when the jacket is closed.

Figure 9:
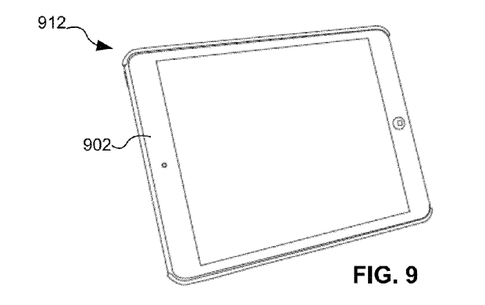
FIG. 9 is a perspective view of a shell receiving a tablet computer, consistent with an embodiment of the present disclosure.

Referring to FIGS. 9-12, the use of embodiments of a modular tablet case is shown and described in greater detail. As shown in FIG. 9, a tablet computer 902 may be secured in a shell 912. When secured in the shell 912, the tablet computer 902 may be used together with a jacket or without the jacket. The tablet computer 902 in the shell 912 may be used with the jacket by coupling the shell 912 to the jacket or supporting the shell 912 on a stand formed by the jacket, as described below.

Figure 10A:
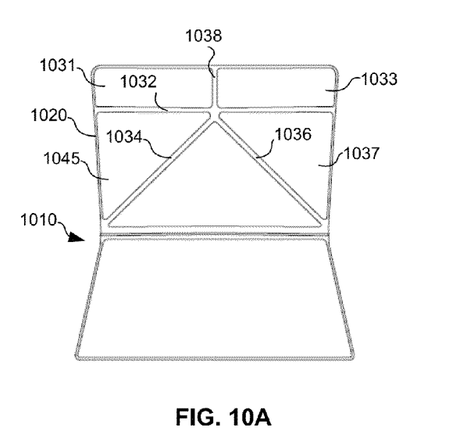
FIGS. 10A-10D illustrate a jacket being folded into a stand configuration, consistent with an embodiment of the present disclosure.
Figure 10B:
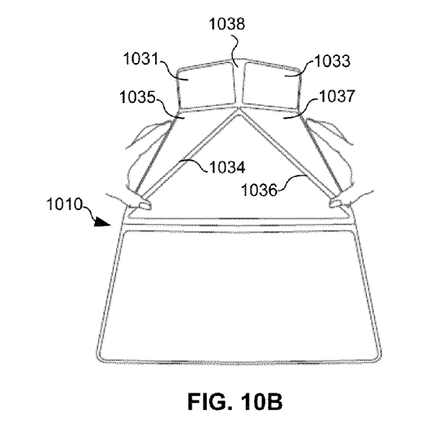
Figure 10C:
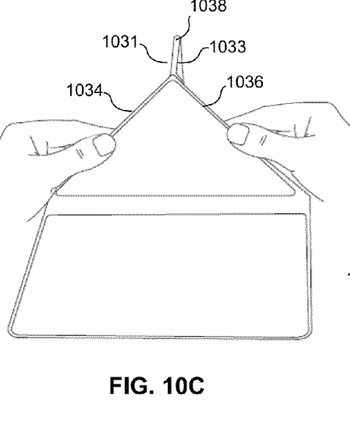
Figure 10D:
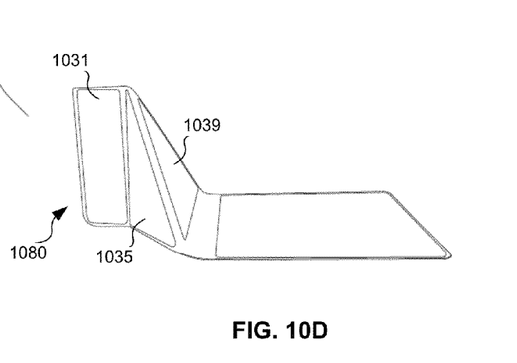

FIGS. 10A-10D illustrate one method of folding a jacket 1010 to form one configuration of a stand 1080. As shown in FIGS. 10A and 10B, the end panels 1031, 1033 and foldable triangular panels 1035, 1037 may be folded along the lengthwise foldable line 1032, the lateral foldable line 1038 and the diagonal foldable lines 1034, 1036 in a backwards direction away from the inside surface of the jacket 1010. When the end panels 1031, 1033 contact each other, as shown in FIG. 10C, the corresponding magnetic coupling regions in the end panels 1031, 1033 will magnetically couple to hold the end panels together. The edge of the end panels 1031, 1033 and/or foldable triangular panels 1035, 1037 thus form the stand 1080 that rests on a support surface such that the central triangular panel 1039 provides a support surface, as shown in FIG. 10D. The shell 912 including the tablet computer 902 may then be supported against the stand 1080. Alternatively, a tablet computer may be supported against the stand 1080 without the shell.

Figure 11A:
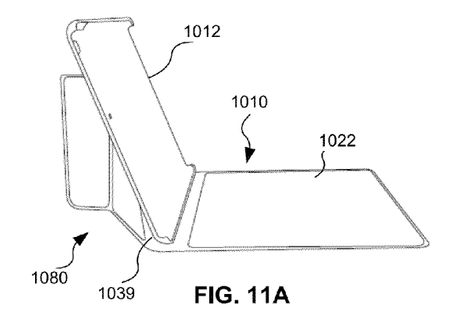
FIGS. 11A-11F illustrate various positions of a shell supported on the stand configuration formed by the folded jacket, consistent with an embodiment of the present disclosure.
Figure 11B:
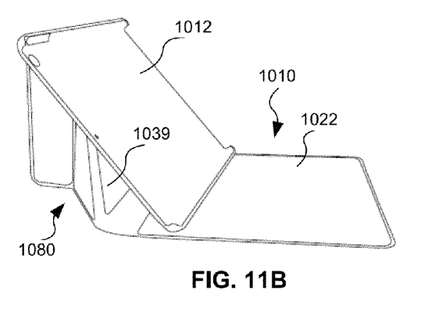
Figure 11C:
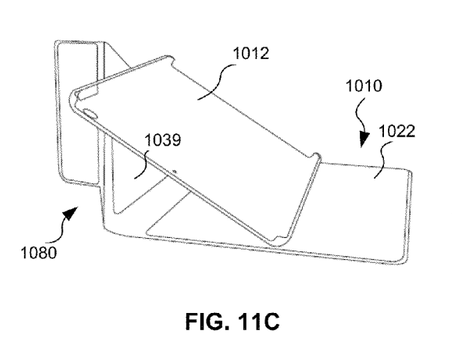
Figure 11D:
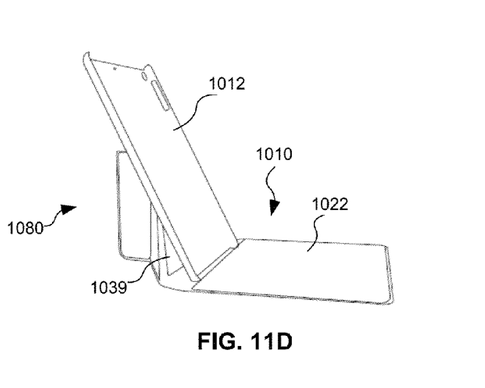
Figure 11E:
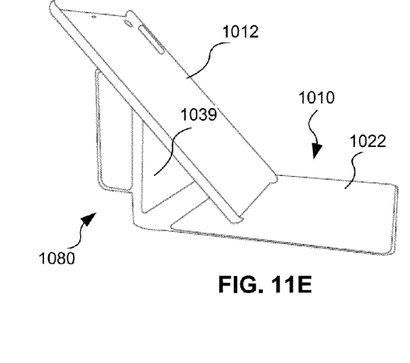
Figure 11F:
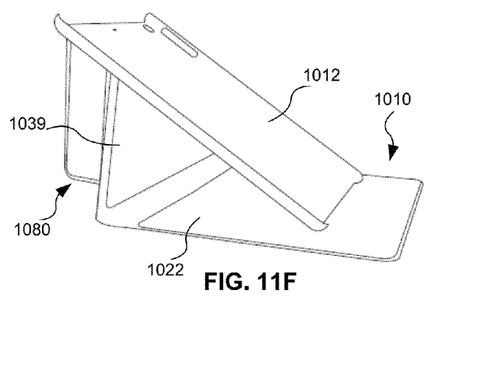

FIGS. 11A-11F show various orientations for a shell 1012 resting on the stand 1080 formed by the folded jacket 1010. FIG. 11A shows the shell 1012 in a landscape orientation supported directly against the central triangular panel 1039. In this orientation, corresponding magnetic coupling regions in the central triangular panel 1039 and the shell 1012 may hold the shell in place. FIGS. 11B and 11C show the shell 1012 in a landscape orientation resting against the central triangular panel 1039 and second jacket portion 1022 with different angular positions. In these orientations, the non-slip surfaces on the inside surfaces of the jacket 1010 and the back side of the shell 1012 may prevent the shell from slipping. FIGS. 11D-11F show the shell 1012 in a portrait orientation and in similar angular positions leaning against the stand 1080.

Figure 12A:
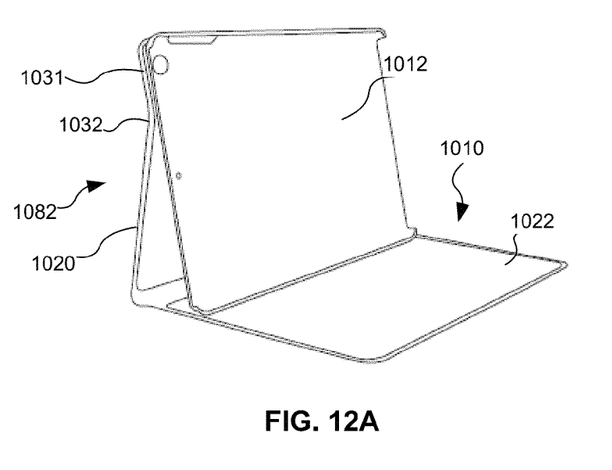
FIGS. 12A-12C illustrate various positions of a shell supported on another embodiment of a stand configuration formed by a folded jacket.
Figure 12B:
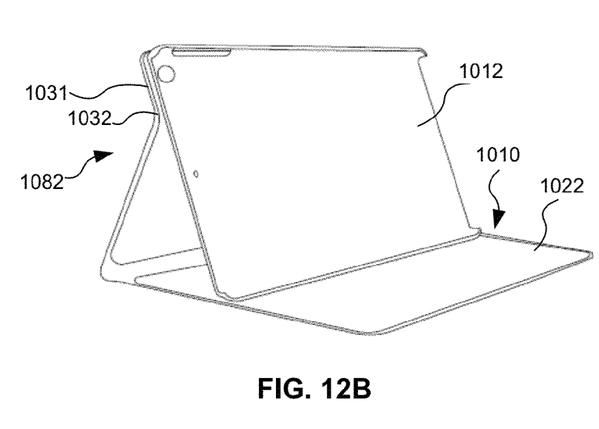
Figure 12C:
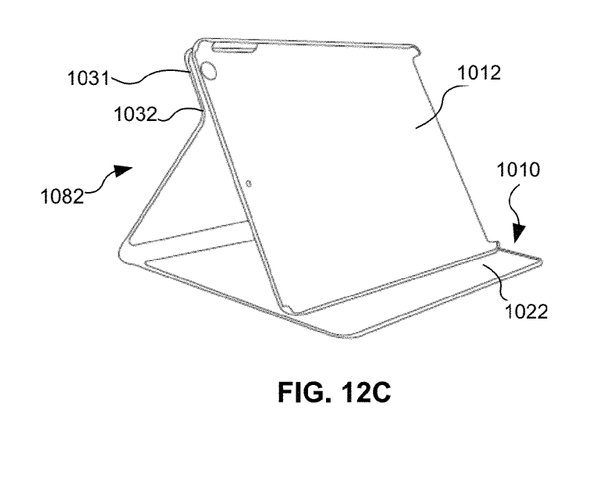

FIGS. 12A-12C show another method for folding the jacket to form another configuration of a stand 1082. In this configuration, the first jacket portion 1020 is folded along the lengthwise foldable line 1032 and the shell 1012 rests on the end panels 1031, 1033 and the second jacket portion 1022. FIGS. 10A-10C show different angular positions for the shell 1012. Magnetic coupling regions in the end panels 1031, 1033 may be magnetically coupled to magnetic coupling regions in the shell 1012 to hold the shell in the supported positions. A non-slip surface on inside of the jacket 1010 and the back side of the shell 1012 may also prevent the shell 1012 from slipping out of the supported positions.

Figure 13A:
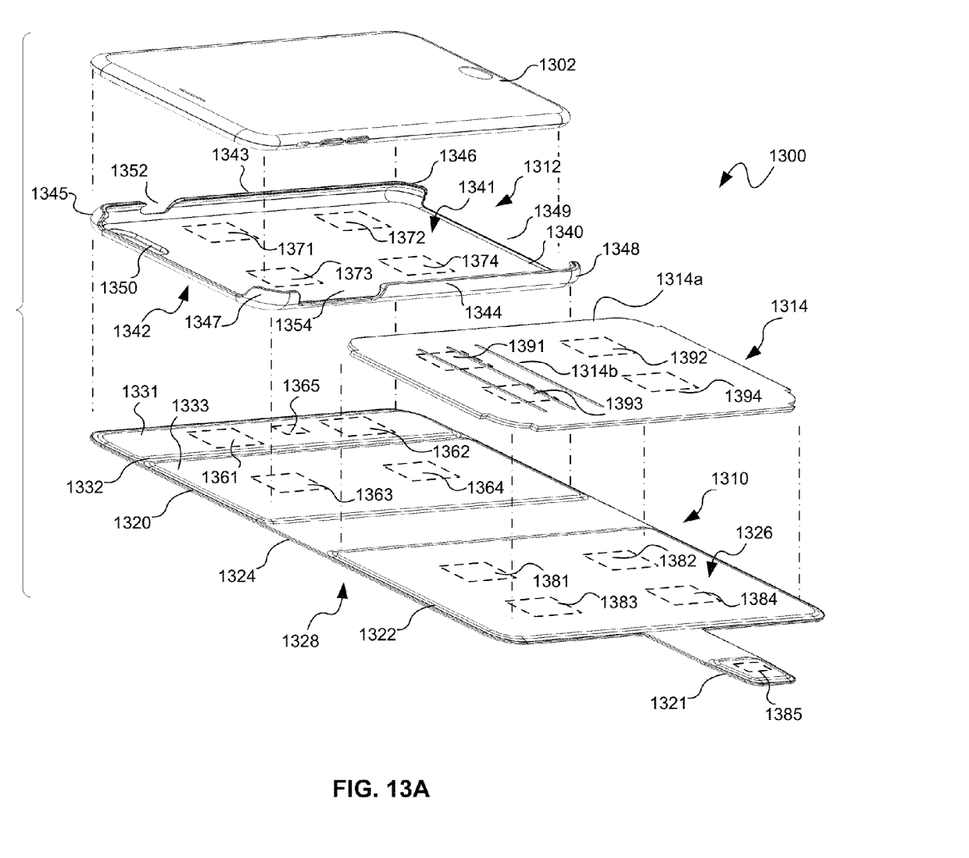
FIG. 13A is an exploded perspective view of yet another embodiment of a modular electronic device case, consistent with the present disclosure.
Figure 13B:
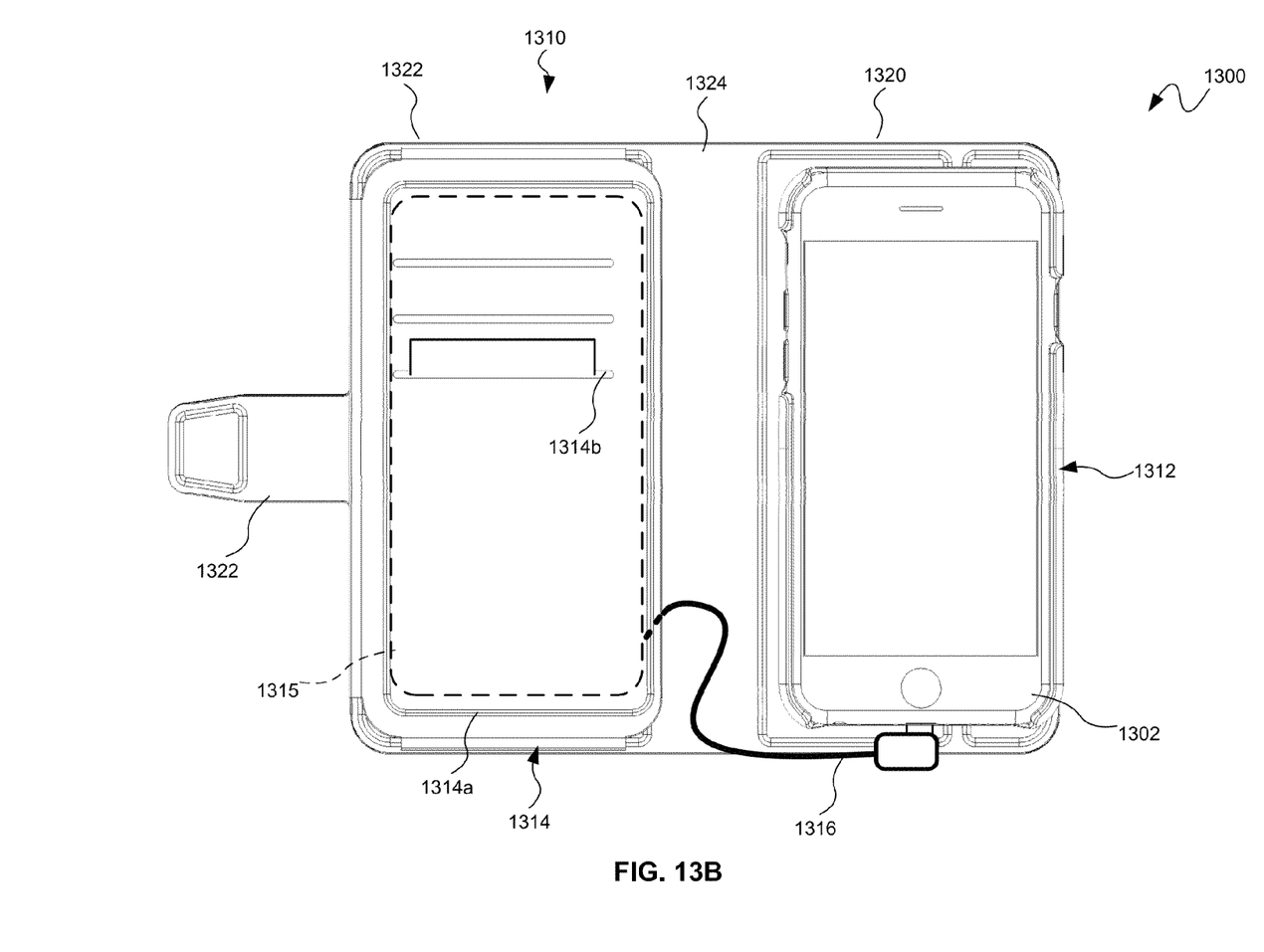
FIG. 13B is a plan view of the modular electronic device case show in FIG. 13A, assembled and opened with a backup battery connected to the electronic device.

FIGS. 13A and 13B show yet another embodiment of a modular electronic device case 1300 for holding and covering a tablet-shaped electronic device 1302. This embodiment of the modular electronic device case 1300 may be used for a smaller sized tablet computer such as the iPhone® tablet-shaped smart phone. The modular electronic device case 1300 includes a jacket 1310 and a shell 1312 removably coupled to one portion of the jacket 1310. The shell 1312 may be magnetically coupled to the jacket 1310 or may be removably coupled using fasteners such as snaps or hook and loop fasteners. In this embodiment, one or more pockets 1314 are coupled to another portion of the jacket 1310 and may be configured to hold various items such as a backup battery 1315, credit cards, identification card, money and the like. The pockets 1314 may be removably coupled to the jacket 1310, for example, using magnetic coupling or fasteners. In other embodiments, the pockets 1314 may also be integral with the jacket 1310.

The jacket 1310 includes a first jacket portion 1320 hingedly coupled to a second jacket portion 1322 with a hinge 1324. The hinge 1324 may be a living hinge formed by the material forming the first and second jacket portions 1320, 1322. The jacket 1310 has an inside surface 1326 and an outside surface 1328. The shell 1312 and the pocket(s) 1314 may be removably coupled to first jacket portion 1320 and the second jacket portion 1322, respectively, on the inside surface 1326. The first and second jacket portions 1320, 1322 may thus be closed by folding along the hinge 1324 to cover the tablet-shaped electronic device 1302 when attached to the jacket 1310.

The jacket 13010 may also include a closure 1321 for closing the first and second jacket portions 1320, 1322. In the illustrated embodiment, the closure 1321 extends from the second jacket portion 1322 and is magnetically coupled to the first jacket portion 1320. The closure 1321 may also extend from the first jacket portion 1320 for magnetically coupling to the second jacket portion 1322. The closure 1321 may also be removably coupled to the first jacket portion 1320 and/or the second jacket portion 1322 using other types of fasteners including, without limitation, snaps or hook and loop fasteners.

In this embodiment, the first jacket portion 1320 includes at least one lengthwise foldable line 1332 extending lengthwise across the first jacket portion 1320 forming foldable panels 1331, 1333. The foldable line 1332 may be formed as a living hinge from the material of the first jacket portion 1320. The first jacket portion 1320 may be folded along the lengthwise foldable line 1332 to form a stand configuration for the tablet-shaped electronic device 1302, for example, similar to the embodiment shown in FIGS. 12A-12C.

In the illustrated embodiment, the first jacket portion 1320 has a size and shape corresponding to the size and shape of the shell 1312 such that the first jacket portion 1320 substantially covers the shell 1312 when the case 1300 is closed. The first jacket portion 1320 may be slightly larger or smaller than the shell 1312 and still substantially cover the shell 1312. In other embodiments, the first jacket portion 1320 may have other shapes and sizes that do not cover the shell 1312 but are still configured to be coupled to the shell 1312.

The shell 1312 is designed to receive and secure the tablet-shaped electronic device 1302. The shell 1312 includes a main body portion 1340 with a front side 1341 for receiving the tablet-shaped electronic device 1302 and a back side 1342 for removably coupling to the first jacket portion 1320. The shell 1312 also includes at least two edge portions 1343, 1344 that grip opposing edges of the tablet-shaped electronic device 1302 to hold the tablet-shaped electronic device 1302 with a friction fit against the front side 1341 of the shell 1312. In the example embodiment, the edge portions 1343, 1344 extend lengthwise and include corner portions 1345, 1346, 1347, 1348 that engage four corners of the tablet-shaped electronic device 1302. Other configurations of the shell 1312 capable of securing a tablet-shaped electronic device are also within the scope of the present disclosure. The shell 1312 may include, for example, only two corner portions or may include edge portions on the other edges of the main body portion 1340.

The shell 1312 may be designed to provide access to inputs and outputs of the tablet-shaped electronic device 1302 when secured in the shell 1312. The example embodiment of the shell 1312 includes a camera window 1350 located in the main body portion 1340 and aligned with the camera on the tablet-shaped electronic device 1302, a power button window 1352 located in the edge portion 1343, and a control window 1354 located in the edge portion 1344 and aligned with controls (e.g., volume) on the tablet-shaped electronic device. At least one edge 1349 of the shell 1312 may be open, for example, to provide access to inputs/outputs, connectors and/or speakers. The shell 1312 may also include other input/output access windows in other locations depending upon the tablet-shaped electronic device. The control access windows may be any type of openings or cut outs capable of providing access to an input or output of the tablet-shaped electronic device to allow the input or output to function. The first jacket portion 1320 may also include a corresponding camera window (not shown) such that the tablet-shaped electronic device 1302 may be used to take pictures without removing the device 1302 and shell 1312 from the jacket 1310.

In the illustrated embodiment, as shown in FIG. 13B, a backup battery pocket 1314a is configured to hold a backup battery 1315. The backup battery 1315 may include a battery known to those skilled in the art for use with a tablet computer such as an iPhone® smart phone. Examples of a backup battery 1315 include a battery with an 1800 milli-ampere hour (mAh) capacity for an iPhone® 6 smart phone and a battery with a 2100 mAh capacity for an iPhone® 6 plus smart phone.

Figure 13C:
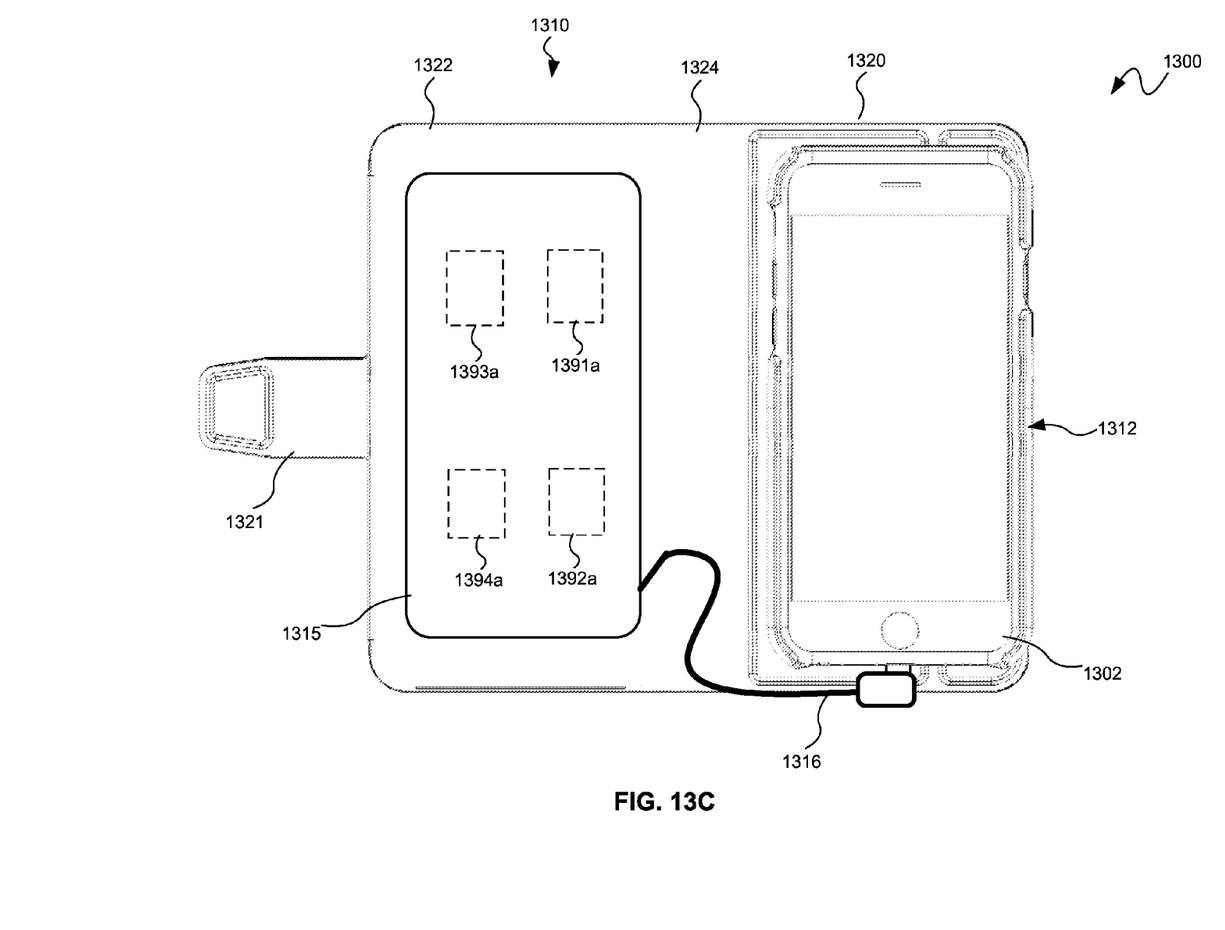
FIG. 13C is a plan view of another embodiment of the modular electronic device case show in FIG. 13A, assembled and opened with a backup battery coupled to the second jacket portion and connected to the electronic device.

In other embodiments, the backup battery 1315 may be magnetically coupled to the second jacket portion 1320, as shown in FIG. 13C, instead of or in addition to being held in the backup battery pocket 1314a. For example, the backup battery 1315 may include metal inserts and/or magnets 1391a-1394a that magnetically couple to one or more magnetic coupling regions 1381-1384 (see FIG. 13A) within the second jacket portion 1322. The jacket 1310 may also include a flap (not shown) for covering the tablet-shaped electronic device 1302 and/or the battery 1315 to protect the screen of the tablet-shaped electronic device 1302.

The backup battery 1315 may be received and oriented in the jacket 1310 to allow the tablet-shaped electronic device 1302 to be charged with the case is closed. In the illustrated embodiment, for example, the backup battery pocket 1314a has an opening facing the inside of the case 1300 toward the electronic device 1302. The backup battery 1315 may thus be positioned within the backup battery pocket 1314a such that a battery cable 1316 may be connected from the battery 1315 to the electronic device 1302. Although the case 1300 is shown as open, the case 1300 may be closed with both the backup battery 1315 and the tablet-shaped electronic device 1302 located in the case 1300 while charging.

Credit card pockets 1314b may be located in a side of the backup battery pocket 1314a and configured to receive credit cards or other objects of a credit card size (e.g., a driver's license or other ID card). One embodiment of the at least one pocket 1314 may be formed by first and second pocket sides attached on at least three edges leaving an opening sized to receive the backup battery 1315. The credit card pockets 1314b may be formed in at least one of the pocket sides.

The modular case 1300 may also include one or more pockets in other locations, for example, credit card pockets on the outside of one or both jacket portions 1320, 1322. The modular case 1300 may also include additional pockets or other structures for incorporating other peripherals used with tablet computers or tablet-shaped electronic devices.

In the example embodiment, the shell 1312 and the pocket 1314 are removably coupled to the jacket 1310 using magnetic coupling. To provide magnetic coupling between the first jacket portion 1320 and the shell 1312, the first jacket portion 1320 includes one or more magnetic coupling regions 1361-1364 and the shell 1312 includes one or more corresponding magnetic coupling regions 1371-1374. To provide magnetic coupling between the second jacket portion 1322 and the pocket 1314, the second jacket portion 1322 includes magnetic coupling regions 1381-1384 and the pocket 1314 includes one or more corresponding magnetic coupling regions 1391-1394. In this embodiment, the closure 1321 also includes a magnetic coupling region 1385 for magnetically coupling to a corresponding magnetic coupling region 1365 on the first jacket portion 1320.

A magnetic coupling region may include one or more magnets oriented with a polarity for magnetically attracting and coupling a magnet with an opposite polarity in a corresponding magnetic coupling region. A magnetic coupling region may also include one or more pieces of magnetically attractive material, such as a metal, capable of magnetically coupling to a magnet. Although four magnetic coupling regions are shown in each jacket portion 1320, 1322, other numbers of magnetic coupling regions may also be used. In other embodiments, other coupling mechanisms may be used including, without limitation, hook and loop fasteners or snaps.

In the jacket 1310, for example, one or more of the first jacket portion magnetic coupling regions 1361-1364 in the panels 1331, 1333 may be magnetically coupled to one or more of the corresponding shell magnetic coupling regions 1371-1374 in the shell 1312 such that the back side 1342 of the shell 1312 is held against the inside surface 1326 of the first jacket portion 1320. In one stand configuration when the first jacket portion 1320 is folded along the lengthwise foldable line 1332, for example, the first jacket portion magnetic coupling regions 1361, 1362 in the end panel 1331 may be magnetically coupled to the corresponding shell magnetic coupling regions 1371, 1372 in the shell 1312. As shown in the illustrated embodiment, one or more shell magnetic coupling regions 1371, 1372 are located proximate an outer region of the shell 1312 proximate an edge of the shell 1312. Thus, the outer region of the shell 1312 is magnetically coupled to the corresponding first jacket portion magnetic coupling regions 1361, 1362 in the end panel 1331. Although the end panel 1331 is shown as rectangular shaped, the end panel 1331 may also have other shapes.

In this embodiment, the structures of the jacket 1310 and the shell 1312 may be designed with a relative low profile similar to those described above. As described above, the jacket 1310 may be made from outer layers of a flexible material to provide the desired flexibility (e.g., at the hinge 1324 and foldable line 1332) with additional rigid layers between the outer layers to provide rigidity in certain locations (e.g., in the panels 1331, 1333 of the first jacket portion 1320 and in the second jacket portion 1322).

In this embodiment, the outer layer on the outside of the jacket 1310 may be made of a leather, simulated leather or other similar material with a matte leather finish. The outer layer on the shell 1312 may also include a leather, simulated leather material or other material with a matte leather finish.

Magnets and/or magnetically attractive material may be sandwiched between the outer layers to provide the magnetic coupling regions as discussed above. As shown in FIG. 13A, for example, the magnetic coupling regions 1361-1364 in the first jacket portion 1320 may include one or more magnets aligned with one or more magnets in the magnetic coupling regions 1371-1374 in the shell 1312. These magnets are oriented such that north and south polarities of corresponding magnets are aligned when the shell 1312 is in the desired position relative to the first jacket portion 1320. Thus, the position, orientation and polarities of the magnets facilitate orientation and alignment when magnetically coupling the shell 1312 to the first jacket portion 1320. The magnetic coupling regions 1381-1384 in the second jacket portion 1322 may include one or more magnets with positions and/or orientations aligned with magnetically attractive material (e.g., metal strips) in the the magnetic coupling regions 1391-1394 of the pocket 1314 to facilitate magnetic coupling between the pocket 1314 and the second jacket portion 1322 in the desired position/orientation.

Accordingly, a modular electronic device case, consistent with embodiments of the present disclosure, may be used to hold, protect and support a tablet-shaped electronic device with versatility and without adding significant weight and/or bulk. In some embodiments, the modular electronic device is capable of incorporating additional peripherals such as a keyboard or a backup battery while maintaining a relatively compact, low profile.

Consistent with an embodiment, a modular case is provided for a tablet-shaped electronic device. The modular case includes a shell having a front side and a back side. The front side of the shell is configured to receive a tablet-shaped electronic device and the back side of the shell includes a shell magnetic coupling region. The modular case also includes a first jacket portion and a second jacket portion hingedly coupled to the first jacket portion. The first jacket portion includes a first jacket portion magnetic coupling region configured to be magnetically coupled to the shell magnetic coupling region on the back side of the shell.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A modular case for a tablet-shaped electronic device, the modular case comprising:
    a shell having a front side and a back side, wherein the front side of the shell is configured to receive a tablet-shaped electronic device and wherein the back side of the shell includes at least one shell magnetic coupling region, wherein the at least one shell magnetic coupling region is located on an outer region of the shell proximate an edge of the shell;
    at least one pocket including at least one pocket magnetic coupling region;
    a first jacket portion including a first jacket portion magnetic coupling region configured to be magnetically coupled to the shell magnetic coupling region on the back side of the shell, wherein the first jacket portion has a size and shape corresponding to a size and shape of the shell such that the first jacket portion substantially covers the shell when the case is closed, wherein the first jacket portion and the shell are rectangular, wherein the first jacket portion includes at least one lengthwise foldable line extending lengthwise across the first jacket portion forming at least one end panel, wherein the first jacket portion magnetic coupling region is located in at least the end panel such that the end panel is configured to be magnetically coupled to the outer region of the shell magnetic coupling region when the first jacket portion is folded along the lengthwise foldable line to form a stand; and
    a second jacket portion hingedly coupled to the first jacket portion and including a second jacket portion magnetic coupling region configured to be magnetically coupled to the pocket magnetic coupling region.

2. The modular case of claim 1, wherein the at least one pocket includes a battery pocket configured to receive and hold a backup battery.

3. The modular case of claim 2, further comprising a backup battery configured to be received in the pocket and electrically connected to the electronic device.

4. The modular case of claim 1, wherein the at least one pocket includes card pockets configured to receive and hold credit card size objects.

5. The modular case of claim 1, wherein the shell comprises:
    a main body portion shaped to cover a back portion of the tablet-shaped electronic device; and
    at least two edge portions configured to grip opposing edges of the tablet-shaped electronic device such that the tablet-shaped electronic device is held with a friction fit against the front side of the main body portion.

6. The modular case of claim 5, wherein the main body portion includes a camera window aligned with a camera location on the tablet-shaped electronic device.

7. The modular case of claim 5, wherein at least one of the edge portions includes a control window aligned with a controls located on the tablet-shaped electronic device.

8. The modular case of claim 5, wherein the edge portions include lengthwise edge portions.

9. The modular case of claim 5, wherein the edge portions include corner portions configured to engage at least two corners of the tablet-shaped electronic device.

10. The modular case of claim 5, wherein the edge portions include four corner portions configured to engage four corners of the tablet-shaped electronic device.

11. The modular case of claim 1, wherein the first and second jacket portions are hingedly coupled with a living hinge.

12. The modular case of claim 1, further including a closure extending from at least one of the first and second jacket portions for engaging the other of the first and second jacket portions to close the jacket.

13. The modular case of claim 12, wherein the closure magnetically couples to the other of the first and second jacket portions.

14. The modular case of claim 1, wherein the shell magnetic coupling region and the first jacket portion magnetic coupling region are configured to have a stronger magnetic coupling with the shell in one orientation relative to the first jacket portion.

15. The modular case of claim 1, wherein the jacket has a thickness less than 5 mm.

16. The modular case of claim 1, wherein the shell has a thickness less than 15 mm.

17. A modular case for a tablet-shaped electronic device, the modular case comprising:
    a shell having a front side and a back side, wherein the front side of the shell is configured to receive a tablet-shaped electronic device and wherein the back side of the shell includes at least one shell magnetic coupling region, wherein the at least one shell magnetic coupling region is located on an outer region of the shell proximate an edge of the shell;
    a first jacket portion including a first jacket portion magnetic coupling region configured to be magnetically coupled to the shell magnetic coupling region on the back side of the shell, wherein the first jacket portion has a size and shape corresponding to a size and shape of the shell such that the first jacket portion substantially covers the shell when the case is closed, wherein the first jacket portion and the shell are rectangular, wherein the first jacket portion includes at least one lengthwise foldable line extending lengthwise across the first jacket portion forming at least one end panel, wherein the first jacket portion magnetic coupling region is located in at least the end panel such that the end panel is configured to be magnetically coupled to the at least one shell magnetic coupling region when the first jacket portion is folded along the lengthwise foldable line to form a stand;
    a second jacket portion hingedly coupled to the first jacket portion; and
    a backup battery configured to be coupled to the second jacket portion.

18. The modular case of claim 17 wherein the backup battery is configured to be magnetically coupled to the second jacket portion.

19. The modular case of claim 17 further including a pocket configured to be coupled to the second jacket portion, and wherein the backup battery is held in the pocket.

* * * * *